United States Patent
Wang et al.

(10) Patent No.: US 12,034,913 B2
(45) Date of Patent: Jul. 9, 2024

(54) METHODS AND APPARATUSES FOR VIDEO CODING WITH TRIANGLE PREDICTION

(71) Applicant: BEIJING DAJIA INTERNET INFORMATION TECHNOLOGY CO., LTD., Beijing (CN)

(72) Inventors: Xianglin Wang, San Diego, CA (US); Yi-Wen Chen, San Diego, CA (US); Xiaoyu Xiu, San Diego, CA (US); Tsung-Chuan Ma, San Diego, CA (US); Hong-Jheng Jhu, San Diego, CA (US); Shuiming Ye, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 108 days.

(21) Appl. No.: 17/522,785

(22) Filed: Nov. 9, 2021

(65) Prior Publication Data

US 2022/0070445 A1  Mar. 3, 2022

Related U.S. Application Data

(63) Continuation of application No. PCT/US2020/032405, filed on May 11, 2020.
(Continued)

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/13* (2014.11);
(Continued)

(58) Field of Classification Search
None
See application file for complete search history.

(56) References Cited

U.S. PATENT DOCUMENTS

| 10,248,966 B2 | 4/2019 | Helle et al. | |
| 2013/0202038 A1* | 8/2013 | Seregin | H04N 19/52 375/240.15 |

(Continued)

OTHER PUBLICATIONS

RWTH Aachen University, Blaser et al., "CE10-related: Bi-directional motion vector storage for triangular prediction", Joint Video Experts Team (JVET), of ITU-T SG 16 WP 3 and ISO/IEC JTC 1/SC 29/WG 11, JVET-M0581, 13th Meeting: Marrakech, MA, Jan. 9-18, 2019,(4p).

(Continued)

*Primary Examiner* — Talha M Nawaz
(74) *Attorney, Agent, or Firm* — Arch & Lake LLP

(57) ABSTRACT

Methods and apparatuses are provided for video coding. The method includes: partitioning video pictures into a plurality of coding units (CUs), at least one of which is further partitioned into two prediction units (PUs) including at least one geometric shaped PU; obtaining a first merge list including a plurality of candidates, each including one or more motion vectors; and obtaining a uni-prediction merge list for the geometric shaped PU by selecting the one or more motion vectors directly from the first merge list.

12 Claims, 9 Drawing Sheets

Related U.S. Application Data

(60) Provisional application No. 62/846,560, filed on May 10, 2019.

(51) Int. Cl.
| | | |
|---|---|---|
| *H04N 19/13* | (2014.01) | |
| *H04N 19/139* | (2014.01) | |
| *H04N 19/46* | (2014.01) | |
| *H04N 19/52* | (2014.01) | |
| *H04N 19/573* | (2014.01) | |

(52) U.S. Cl.
CPC .......... *H04N 19/139* (2014.11); *H04N 19/46* (2014.11); *H04N 19/52* (2014.11); *H04N 19/573* (2014.11)

(56) References Cited

U.S. PATENT DOCUMENTS

| | | | | |
|---|---|---|---|---|
| 2014/0161179 A1* | 6/2014 | Seregin | ............... | H04N 19/59 375/240.12 |
| 2014/0192883 A1* | 7/2014 | Seregin | ............... | H04N 19/33 375/240.16 |
| 2017/0310988 A1 | 10/2017 | Lin et al. | | |
| 2021/0152825 A1* | 5/2021 | Reuze | ............... | H04N 19/119 |
| 2021/0203931 A1* | 7/2021 | Yang | ............... | H04N 19/119 |
| 2021/0227247 A1* | 7/2021 | Blaeser | ............... | H04N 19/52 |

OTHER PUBLICATIONS

Fraunhofer HHI, Winken et al., "CE4 Restricted merge (Test 4.2.2)", 1Joint Video Experts Team (JVET), of ITU-T SG 16 WP 3 and ISO/IEC JTC 1/SC 29/WG 11, JVET-K0279-v1, 11th Meeting: Ljubljana, SI, 2 Jul. 10-18, 2018,(4p).

International Search Report of PCT Application No. PCT/US2020/032405 dated Aug. 24, 2020, (11p).

Wang, Xianglin, et al., "CE4-related: An improved method for triangle merge list construction", JVET-N0340, Joint Video Experts Team (JVET) of ITU-T SG 16 WP 3 and ISO/IEC JTC 1/SC 29/WG 11, 14th Meeting: Geneva, CH, Mar. 20, 2019, (3p).

Meng, Xuewei, et al., "CE4-related: Further simplification of triangle prediction merging candidate list derivation", JVET-N0487, Joint Video Experts Team (JVET) of ITU-T SG 16 WP 3 and ISO/IEC JTC 1/SC 29/WG 11, 14th Meeting: Geneva, CH, Mar. 27, 2019, (4p).

Chuang, Tzu-Der, et al., "CE4-4.1: Simplification of triangle merging candidate list derivation," JVET-N0083, Joint Video Experts Team (JVET) of ITU-T SG 16 WP 3 and ISO/IEC JTC 1/SC 29/WG 11, 14th Meeting: Geneva CH, Mar. 18, 2019, (13p).

* cited by examiner

| Merge Index | L0 MV | L1 MV |
|---|---|---|
| 0 | x | |
| 1 | | x |
| 2 | x | |
| 3 | | x |
| 4 | x | |

FIG. 11A

| Merge Index | L0 MV | L1 MV |
|---|---|---|
| 0 | | x |
| 1 | x | |
| 2 | | x |
| 3 | x | |
| 4 | | x |

FIG. 11B

| Merge Index | L0 MV | L1 MV |
|---|---|---|
| 0 | x | |
| 1 | x | |
| 2 | x | |
| 3 | | x |
| 4 | | x |

FIG. 12A

| Merge Index | L0 MV | L1 MV |
|---|---|---|
| 0 | | x |
| 1 | | x |
| 2 | x | |
| 3 | x | |
| 4 | x | |

FIG. 12B

| Merge Index | L0 MV | L1 MV |
|---|---|---|
| 0 | x | |
| 1 | | x |
| 2 | | x |
| 3 | x | |
| 4 | x | |

FIG. 12C

| Merge Index | L0 MV | L1 MV |
|---|---|---|
| 0 | | x |
| 1 | | x |
| 2 | x | |
| 3 | x | |
| 4 | | x |

FIG. 12D

```
┌─────────────────────────────────────────────────────────────────────┐
│ Partitioning video pictures into a plurality of coding units (CUs), at least │
│ one of which is further portioned into two prediction units (PUs) including │
│           at least one geometric shaped PU              1501        │
└─────────────────────────────────────────────────────────────────────┘
                                  │
                                  ▼
┌─────────────────────────────────────────────────────────────────────┐
│ Constructing a first merge list comprising a plurality of candidates, based │
│ on a merge list construction process for regular merge prediction, where │
│ each one of the plurality of candidates is a motion vector comprising a │
│     List 0 motion vector, or a List 1 motion vector, or both    1502 │
└─────────────────────────────────────────────────────────────────────┘
                                  │
                                  ▼
┌─────────────────────────────────────────────────────────────────────┐
│ Receiving a signaled first index value to indicate a first candidate that is │
│          chosen from the first merge list               1503        │
└─────────────────────────────────────────────────────────────────────┘
                                  │
                                  ▼
┌─────────────────────────────────────────────────────────────────────┐
│ Receiving a signaled second index value to indicate a second candidate │
│          that is chosen from the first merge list       1504        │
└─────────────────────────────────────────────────────────────────────┘
                                  │
                                  ▼
┌─────────────────────────────────────────────────────────────────────┐
│ Receiving a signaled first binary flag that is coded using a first CABAC │
│ context modeling method to indicate whether a List 0 motion vector of │
│ the first candidate or a List 1 motion vector of the first candidate is │
│      selected for a first PU of the geometric prediction    1505    │
└─────────────────────────────────────────────────────────────────────┘
                                  │
                                  ▼
┌─────────────────────────────────────────────────────────────────────┐
│ Receiving a signaled second binary flag that is coded using a second │
│  CABAC context modeling method to indicate whether a List 0 motion  │
│  vector of the second candidate or a List 1 motion vector of the second │
│   candidate is selected for a second PU of the geometric prediction │
│                                                             1506    │
└─────────────────────────────────────────────────────────────────────┘
```

FIG. 15

METHODS AND APPARATUSES FOR VIDEO CODING WITH TRIANGLE PREDICTION

CROSS-REFERENCE TO RELATED APPLICATION

The present application is a continuation of International Application No.: PCT/US2020/032405, filed on May 11, 2020, which claims priority to U.S. Provisional Application No. 62/846,560, entitled "Video Coding with Triangle Prediction" filed on May 10, 2019, the entire disclosures of which are incorporated by reference for all purpose.

FIELD

The present application generally relates to video coding and compression, and in particular but not limited to, methods and apparatus for motion compensated prediction using triangular prediction unit (i.e. a special case of geometric partition prediction unit) in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression. Digital video devices implement video coding techniques, such as those described in the standards defined by Versatile Video Coding (VVC), Joint Exploration Test Model (JEM), MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards.

Video coding generally utilizes prediction methods (e.g., inter-prediction, intra-prediction) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU may be coded in intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data may be encoded/decoded more efficiently while maintaining the image quality of the decoded video data.

In a Joint Video Experts Team (JVET) meeting, JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meetings.

SUMMARY

In general, this disclosure describes examples of techniques relating to motion compensated prediction using geometric shaped prediction unit in video coding.

According to a first aspect of the present disclosure, there is provided a method for video coding with geometric prediction, including: partitioning video pictures into a plurality of coding units (CUs), at least one of which is further partitioned into two prediction units (PUs) including at least one geometric shaped PU; constructing a first merge list comprising a plurality of candidates, based on a merge list construction process for regular merge prediction, wherein each one of the plurality of candidates is a motion vector comprising a List 0 motion vector, or a List 1 motion vector, or both; receiving a signaled first index value to indicate a first candidate that is chosen from the first merge list; receiving a signaled second index value to indicate a second candidate that is chosen from the first merge list; receiving a signaled first binary flag to indicate whether a List 0 motion vector of the first candidate or a List 1 motion vector of the first candidate is selected for a first PU of the geometric prediction; and inferring a second binary flag based on the first binary flag and based on whether a current picture uses a backward prediction to indicate whether a List 0 motion vector of the second candidate or a List 1 motion vector of the second candidate is selected for a second PU of the geometric prediction.

According to a second aspect of the present disclosure, a method for video coding with geometric prediction, including: partitioning video pictures into a plurality of coding units (CUs), at least one of which is further partitioned into two prediction units (PUs) including at least one geometric shaped PU; constructing a first merge list comprising a plurality of candidates, based on a merge list construction process for regular merge prediction, wherein each one of the plurality of candidates is a motion vector comprising a List 0 motion vector, or a List 1 motion vector, or both; receiving a signaled first index value to indicate a first candidate that is chosen from the first merge list; receiving a signaled second index value to indicate a second candidate that is chosen from the first merge list; inferring whether a List 0 motion vector of the first candidate or a List 1 motion vector of the first candidate is selected for a first PU of the geometric prediction; and inferring whether a List 0 motion vector of the second candidate or a List 1 motion vector of the second candidate is selected for a second PU of the geometric prediction.

According to a third aspect of the present disclosure, there is provided an apparatus for video coding with geometric prediction, including g: one or more processors; and a memory configured to store instructions executable by the one or more processors; wherein the one or more processors, upon execution of the instructions, are configured to: partition video pictures into a plurality of coding units (CUs), at least one of which is further partitioned into two prediction units (PUs) including at least one geometric shaped PU; construct a first merge list comprising a plurality of candidates, based on a merge list construction process for regular merge prediction, wherein each one of the plurality of candidates is a motion vector comprising a List 0 motion vector, or a List 1 motion vector, or both; receive a signaled first index value to indicate a first candidate that is chosen from the first merge list; receive a signaled second index value to indicate a second candidate that is chosen from the first merge list; receive a signaled first binary flag to indicate whether a List 0 motion vector of the first candidate or a List 1 motion vector of the first candidate is selected for a first PU of the geometric prediction; and infer a second binary flag based on the first binary flag and based on whether a current picture uses a backward prediction to indicate whether a List 0 motion vector of the second candidate or a List 1 motion vector of the second candidate is selected for a second PU of the geometric prediction.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 11A is a schematic diagram illustrating one example of uni-prediction motion vector (MV) selection for triangle prediction mode in accordance with some implementations of the present disclosure.

FIG. 11B is a schematic diagram illustrating another example of uni-prediction motion vector (MV) selection for triangle prediction mode in accordance with some implementations of the present disclosure.

FIG. 12A is a schematic diagram illustrating one example of uni-prediction MV selection for triangle prediction mode in accordance with some implementations of the present disclosure.

FIG. 12B is a schematic diagram illustrating another example of uni-prediction MV selection for triangle prediction mode in accordance with some implementations of the present disclosure.

FIG. 12C is a schematic diagram illustrating another example of uni-prediction MV selection for triangle prediction mode in accordance with some implementations of the present disclosure.

FIG. 12D is a schematic diagram illustrating another example of uni-prediction MV selection for triangle prediction mode in accordance with some implementations of the present disclosure.

FIG. 15 is a flowchart illustrating an exemplary process of video coding for motion compensated prediction using geometric prediction unit in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein may be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g. devices, components, compositions, steps, etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that may be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
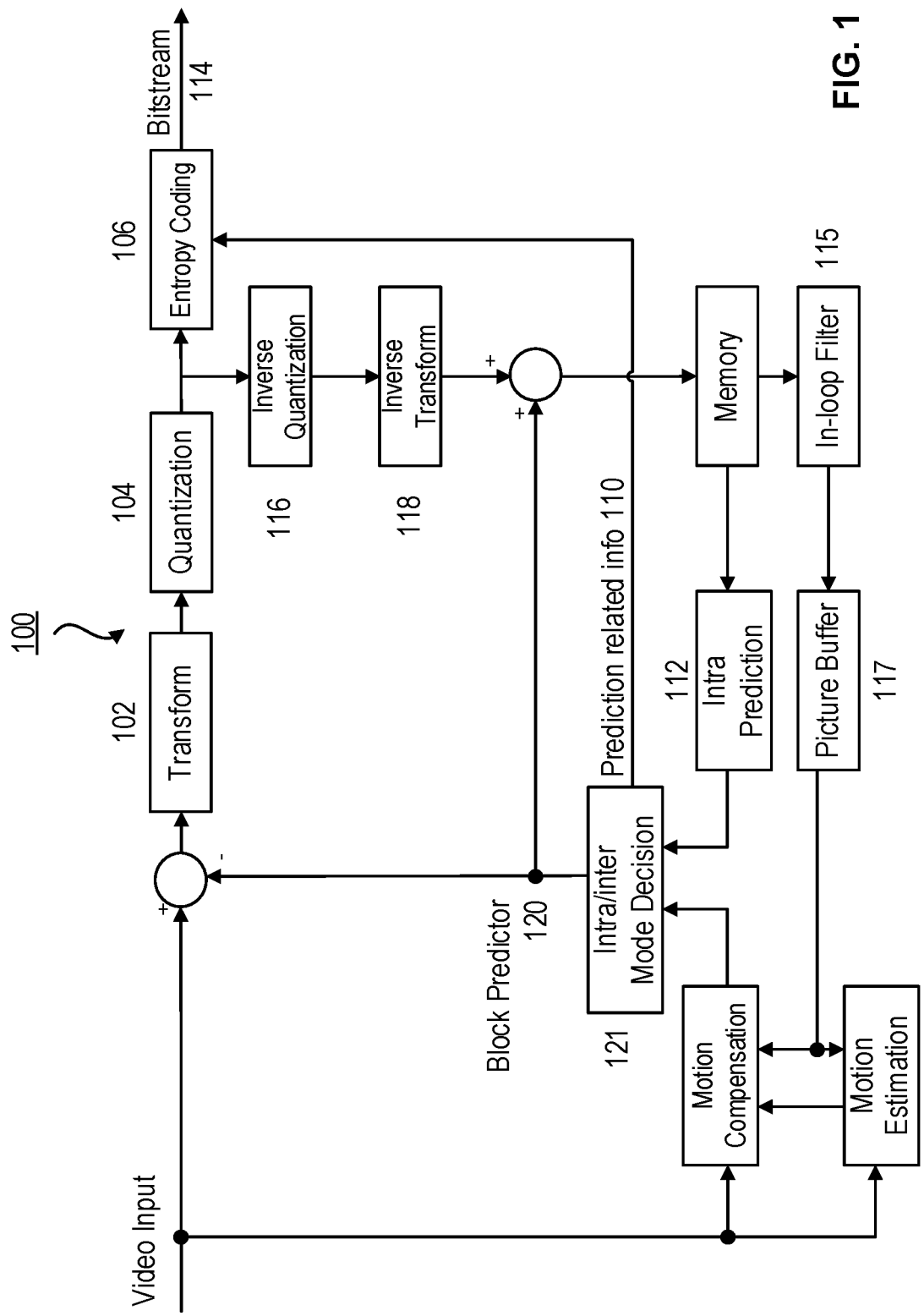
FIG. 1 is a block diagram illustrating an exemplary video encoder in accordance with some implementations of the present disclosure.

FIG. 1 shows a block diagram illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
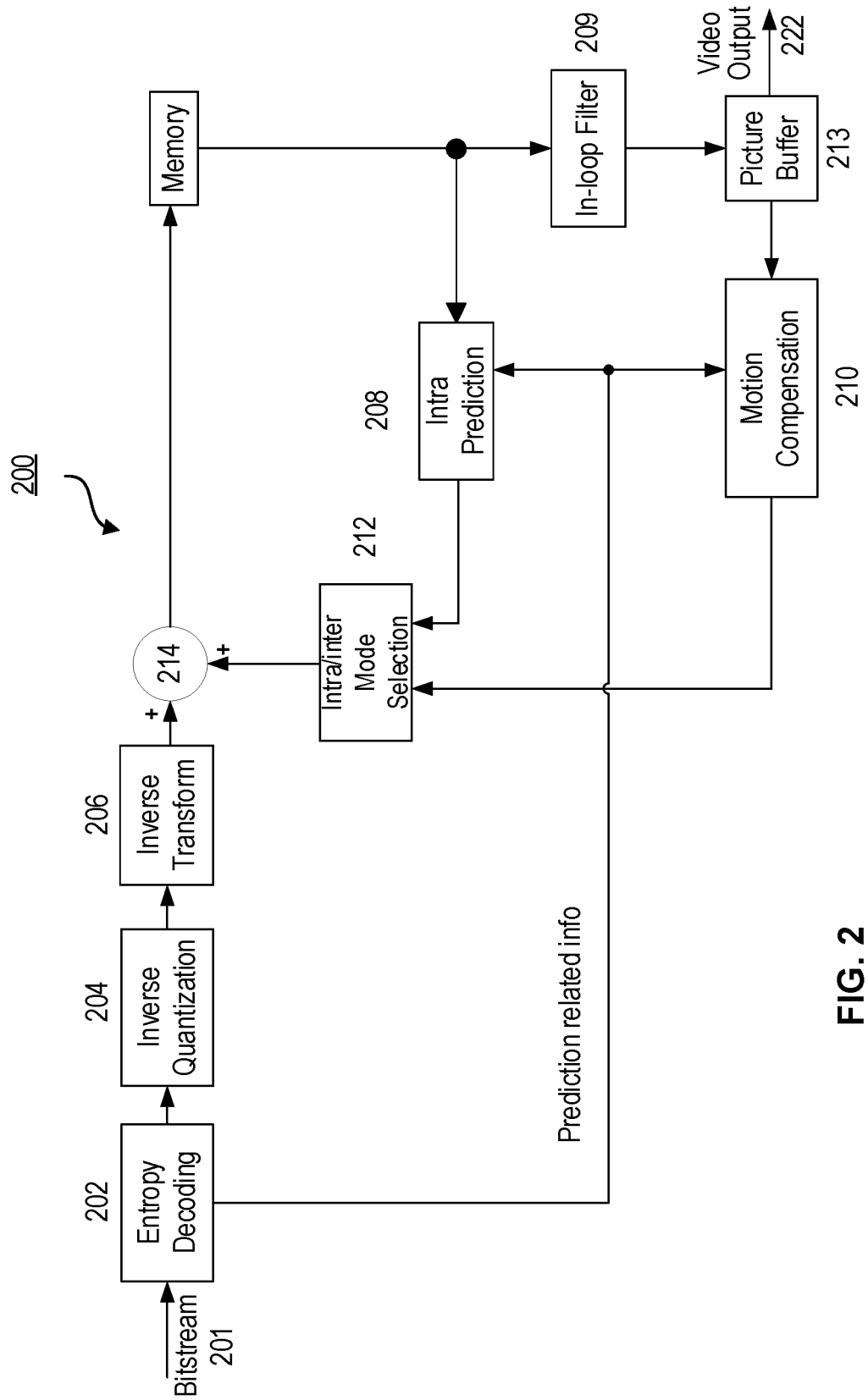
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Video coding/decoding standards mentioned above, such as VVC, JEM, HEVC, MPEG-4, Part 10, are conceptually similar. For example, they all use block-based processing. Block partitioning schemes in some standards are elaborated below.

HEVC is based on a hybrid block-based motion-compensated transform coding architecture. The basic unit for compression is termed coding tree unit (CTU). The maximum CTU size is defined as up to 64 by 64 luma pixels, and two blocks of 32 by 32 chroma pixels for 4:2:0 chroma format. Each CTU may contain one coding unit (CU) or recursively split into four smaller CUs until the predefined minimum CU size is reached. Each CU (also named leaf CU) contains one or multiple prediction units (PUs) and a tree of transform units (TUs).

In general, except for monochrome content, a CTU may include one luma coding tree block (CTB) and two corresponding chroma CTBs; a CU may include one luma coding block (CB) and two corresponding chroma CBs; a PU may include one luma prediction block (PB) and two corresponding chroma PBs; and a TU may include one luma transform block (TB) and two corresponding chroma TBs. However, exceptions may occur because the minimum TB size is 4×4 for both luma and chroma (i.e., no 2×2 chroma TB is supported for 4:2:0 color format) and each intra chroma CB always has only one intra chroma PB regardless of the number of intra luma PBs in the corresponding intra luma CB.

For an intra CU, the luma CB may be predicted by one or four luma PBs, and each of the two chroma CBs is always predicted by one chroma PB, where each luma PB has one intra luma prediction mode and the two chroma PBs share one intra chroma prediction mode. Moreover, for the intra CU, the TB size cannot be larger than the PB size. In each PB, the intra prediction is applied to predict samples of each TB inside the PB from neighboring reconstructed samples of the TB. For each PB, in addition to 33 directional intra prediction modes, DC and planar modes are also supported to predict flat regions and gradually varying regions, respectively.

For each inter PU, one of three prediction modes including inter, skip, and merge, may be selected. Generally speaking, a motion vector competition (MVC) scheme is introduced to select a motion candidate from a given candidate set that includes spatial and temporal motion candidates. Multiple references to the motion estimation allow finding the best reference in 2 possible reconstructed reference picture lists (namely List 0 and List 1). For the inter mode (termed AMVP mode, where AMVP stands for advanced motion vector prediction), inter prediction indicators (List 0, List 1, or bi-directional prediction), reference indices, motion candidate indices, motion vector differences (MVDs) and prediction residual are transmitted. As for the skip mode and the merge mode, only merge indices are transmitted, and the current PU inherits the inter prediction indicator, reference indices, and motion vectors from a neighboring PU referred by the coded merge index. In the case of a skip coded CU, the residual signal is also omitted.

The Joint Exploration Test Model (JEM) is built up on top of the HEVC test model. The basic encoding and decoding flowchart of HEVC is kept unchanged in the JEM; however, the design elements of most important modules, including the modules of block structure, intra and inter prediction, residue transform, loop filter and entropy coding, are somewhat modified and additional coding tools are added. The following new coding features are included in the JEM.

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU may be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU may be partitioned into transform units (TUs) according to another quadtree structure similar to the coding tree for the CU. One of key features of the HEVC structure is that it has the multiple partition conceptions including CU, PU, and TU.

Figure 3:
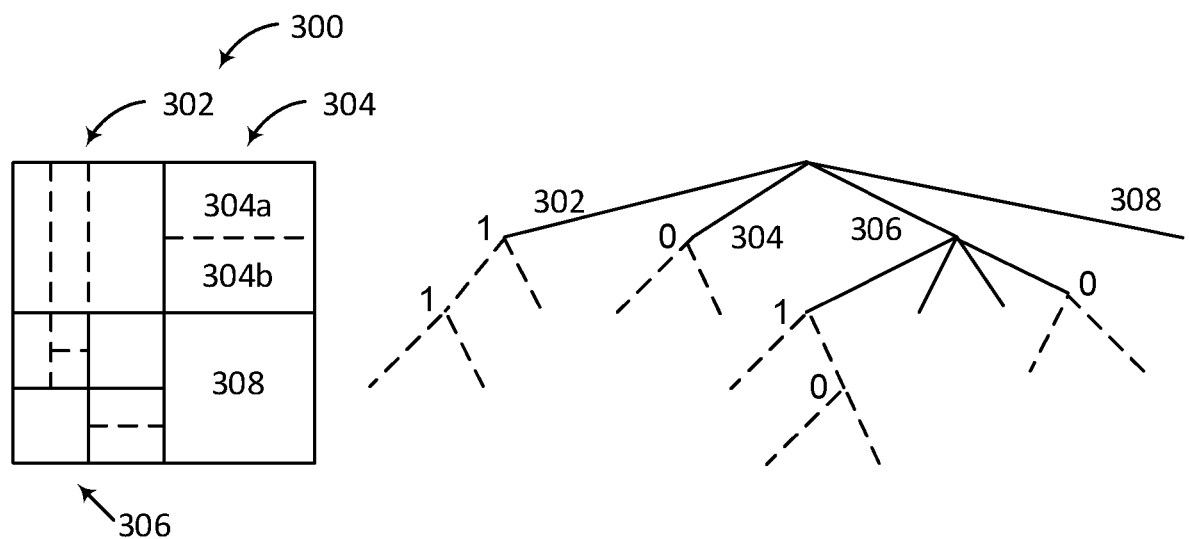
FIG. 3 is a schematic diagram illustrating a quadtree plus binary tree (QTBT) structure in accordance with some implementations of the present disclosure.

FIG. 3 is a schematic diagram illustrating a quadtree plus binary tree (QTBT) structure in accordance with some implementations of the present disclosure.

The QTBT structure removes the concepts of multiple partition types, i.e., it removes the separation of the CU, PU and TU concepts, and supports more flexibility for CU partition shapes. In the QTBT block structure, a CU may have either a square or rectangular shape. As shown in FIG. 3, a coding tree unit (CTU) is first partitioned by a quaternary tree (i.e., quadtree) structure. The quadtree leaf nodes may be further partitioned by a binary tree structure. There are two splitting types in the binary tree splitting: symmetric horizontal splitting and symmetric vertical splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g., one CU contains one luma CB and two chroma CBs in the case of P and B slices of the 4:2:0 chroma format, and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in the HEVC;
MinQTSize: the minimum allowed quadtree leaf node size;
MaxBTSize: the maximum allowed binary tree root node size;
MaxBTDepth: the maximum allowed binary tree depth;
MinBTSize: the minimum allowed binary tree leaf node size.

In one example of the QTBT partitioning structure, the CTU size is set as 128×128 luma samples with two corresponding 64×64 blocks of chroma samples (with a 4:2:0 chroma format), the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the quadtree leaf node is 128×128, it will not be further split by the binary tree since the size exceeds the MaxBTSize (i.e., 64×64). Otherwise, the quadtree leaf node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has a width equal to MinBTSize (i.e., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

An example of block partitioning by using the QTBT scheme, and the corresponding tree representation are illustrated in FIG. 3. The solid lines indicate quadtree splitting and dotted lines indicate binary tree splitting. As shown in FIG. 3, the coding tree unit (CTU) 300 is first partitioned by a quadtree structure, and three of the four quadtree leaf nodes 302, 304, 306, 308 are further partitioned by either a quadtree structure or a binary tree structure. For example, the quadtree leaf node 306 is further partitioned by quadtree splitting; the quadtree leaf node 304 is further partitioned into two leaf nodes 304a, 304b by binary tree splitting; and the quadtree leaf node 302 is also further partitioned by binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For example, for the quadtree leaf node 304, 0 is signaled to indicate horizontal splitting, and for the quadtree leaf node 302, 1 is signaled to indicate vertical splitting. For quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In a Joint Video Experts Team (JVET) meeting, the JVET defined the first draft of the Versatile Video Coding (VVC) and the VVC Test Model 1 (VTM1) encoding method. It was decided to include a quadtree with nested multi-type tree using binary and ternary splits coding block structure as the initial new coding feature of VVC.

In VVC, the picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g. intra or inter). Here, the term "unit" defines a region of an image covering all components; the term "block" is used to define a region covering a particular component (e.g. luma), and may differ in spatial location when considering the chroma sampling format such as 4:2:0.

Partitioning of the Picture into CTUs

Figure 4:
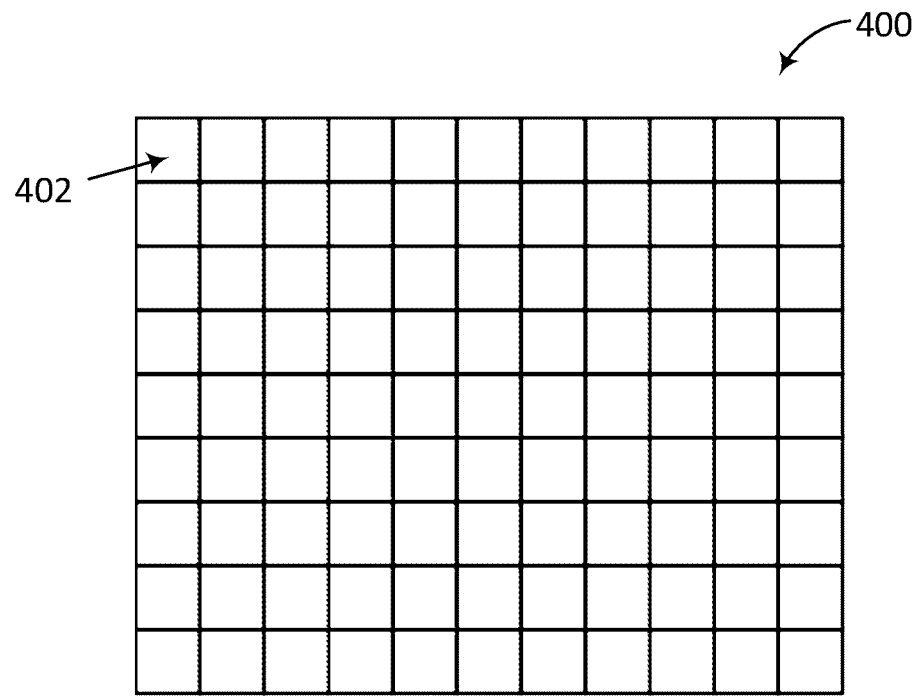
FIG. 4 is a schematic diagram illustrating an example of a picture divided into CTUs in accordance with some implementations of the present disclosure.

FIG. 4 is a schematic diagram illustrating an example of a picture divided into CTUs in accordance with some implementations of the present disclosure.

In VVC, pictures are divided into a sequence of CTUs, and the CTU concept is the same as that of the HEVC. For a picture that has three sample arrays, a CTU consists of an N×N block of luma samples together with two corresponding blocks of chroma samples. FIG. 4 shows the example of a picture 400 divided into CTUs 402.

The maximum allowed size of the luma block in a CTU is specified to be 128×128 (although the maximum size of the luma transform blocks is 64×64).

Partitioning of the CTUs Using a Tree Structure

Figure 5:
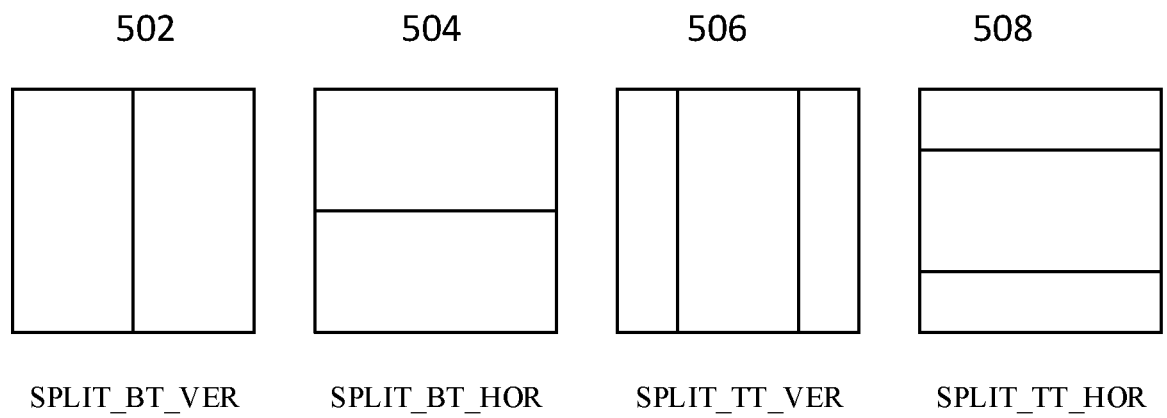
FIG. 5 is a schematic diagram illustrating multi-type tree splitting modes in accordance with some implementations of the present disclosure.

FIG. 5 is a schematic diagram illustrating multi-type tree splitting modes in accordance with some implementations of the present disclosure.

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU may be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a leaf CU may be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU may have either a square or rectangular shape. A coding tree unit (CTU) is first partitioned by a quaternary tree (i.e., quadtree) structure. Then the quaternary tree leaf nodes may be further partitioned by a multi-type tree structure. As shown in FIG. 5, there are four splitting types in multi-type tree structure: vertical binary splitting 502 (SPLIT_BT_VER), horizontal binary splitting 504 (SPLIT_BT_HOR), vertical ternary splitting 506 (SPLIT_TT_VER), and horizontal ternary splitting 508 (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when the maximum supported transform length is smaller than the width or height of the color component of the CU. In VTM1, a CU consists of coding blocks (CBs) of different color components, e.g., one CU contains one luma CB and two chroma CBs (unless the video is monochrome, i.e., having only one color component).

Partitioning CUs into Multiple Prediction Units

In VVC, for each CU partitioned based on the structure illustrated above, prediction of the block content may be performed either on the whole CU block or in a sub-block manner explained in the following paragraphs. The operation unit of such prediction is called prediction unit (or PU).

In the case of intra prediction (or intra-frame prediction), usually the size of the PU is equal to the size of the CU. In other words, the prediction is performed on the whole CU block. For inter prediction (or inter-frame prediction), the size of the PU may be equal or less than the size of the CU. In other words, there are cases where a CU may be split into multiple PUs for prediction.

Some examples of having the PU size smaller than the CU size include an affine prediction mode, an Advanced Temporal Level Motion Vector Prediction (ATMVP) mode, and a triangle prediction mode, etc.

Under the affine prediction mode, a CU may be split into multiple 4×4 PUs for prediction. Motion vectors may be derived for each 4×4 PU and motion compensation may be performed accordingly on the 4×4 PU. Under the ATMVP mode, a CU may be split into one or multiple 8×8 PUs for prediction. Motion vectors are derived for each 8×8 PU and motion compensation may be performed accordingly on the 8×8 PU. Under the triangle prediction mode, a CU may be split into two triangular shape prediction units. Motion vectors are derived for each PU and motion compensation is performed accordingly. The triangle prediction mode is supported for inter prediction. More details of the triangle prediction mode are illustrated below.

Triangle Prediction Mode (or Triangular Partition Mode)

Figure 6:
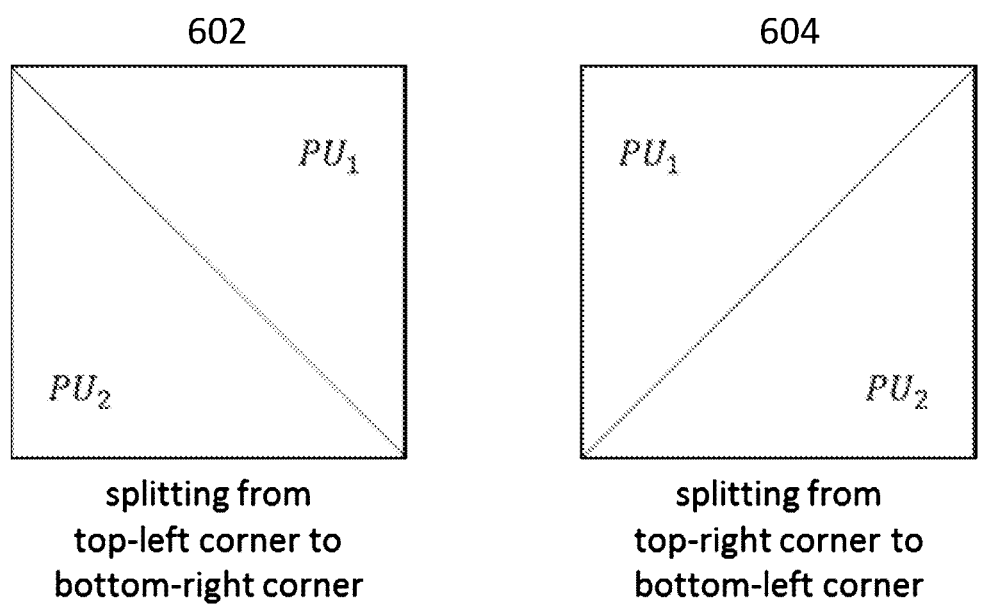
FIG. 6 is a schematic diagram illustrating splitting a CU into triangular prediction units in accordance with some implementations of the present disclosure.

FIG. 6 is a schematic diagram illustrating splitting a CU into triangular prediction units in accordance with some implementations of the present disclosure.

The concept of the triangle prediction mode is to introduce triangular partitions for motion compensated prediction. The triangle prediction mode may also be named the triangular prediction unit mode, or triangular partition mode. As shown in FIG. 6, a CU 602 or 604 is split into two triangular prediction units $PU_1$ and $PU_2$, in either the diagonal or the inverse diagonal direction (i.e., either splitting from top-left corner to bottom-right corner as shown in CU 602 or splitting from top-right corner to bottom-left corner as shown in CU 604). Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes in the current VVC. Although in FIG. 6, the CU is shown as a square block, the triangle prediction mode may be applied to non-square (i.e. rectangular) shape CUs as well.

The uni-prediction candidate list may comprise one or more candidates, and each candidate may be a motion vector. Thus, throughout this disclosure, the terms "uni-prediction candidate list," "uni-prediction motion vector candidate list," and "uni-prediction merge list" may be used interchangeably; and the terms "uni-prediction merge candidates" and "uni-prediction motion vectors" may also be used interchangeably.

Uni-Prediction Motion Vector Candidate List

Figure 7:
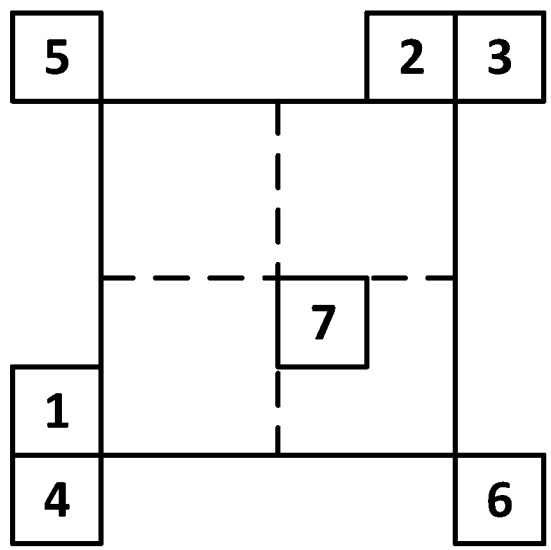
FIG. 7 is a schematic diagram illustrating positions of neighboring blocks in accordance with some implementations of the present disclosure.

FIG. 7 is a schematic diagram illustrating positions of the neighboring blocks in accordance with some implementations of the present disclosure.

In some examples, the uni-prediction motion vector candidate list may include two to five uni-prediction motion vector candidates. In some other examples, other number may also be possible. It is derived from neighboring blocks. The uni-prediction motion vector candidate list is derived from seven neighboring blocks including five spatial neighboring blocks (1 to 5) and two temporal co-located blocks (6 to 7), as shown in FIG. 7. The motion vectors of the seven neighboring blocks are collected into a first merge list. Then, a uni-prediction candidate list is formed based on the first merge list motion vectors according to a specific order. Based on the order, the uni-prediction motion vectors from the first merge list are put in the uni-prediction motion vector candidate list first, followed by reference picture List 0 or L0 motion vector of bi-prediction motion vectors, and then reference picture List 1 or L1 motion vector of bi-prediction motion vectors, and then followed by the averaged motion vector of the L0 and L1 motion vectors of bi-prediction motion vectors. At that point, if the number of candidates is still less than a target number (which is five in the current VVC), zero motion vectors are added to the list to meet the target number.

A predictor is derived for each of the triangular PUs based on its motion vector. It is worth noting that the predictor derived covers a larger area than the actual triangular PU so that there is an overlapped area of the two predictors along the shared diagonal edge of the two triangular PUs. A weighting process is applied to the diagonal edge area between the two predictors to derive a final prediction for the CU. The weighting factors currently used for the luminance and the chrominance samples are $\{7/8, 6/8, 5/8, 4/8, 3/8, 2/8, 1/8\}$ and $\{6/8, 4/8, 2/8\}$, respectively.

Triangle Prediction Mode Syntax and Signaling

Here, triangle prediction mode is signaled using a triangle prediction flag. The triangle prediction flag is signaled when a CU is coded in either skip mode or merge mode. For a given CU, if the triangle prediction flag has a value of 1, it means that the corresponding CU is coded using triangle prediction mode. Otherwise, the CU is coded using a prediction mode other than triangle prediction mode.

For example, the triangle prediction flag is conditionally signaled in either skip mode or merge mode. Firstly, a triangle prediction tool enable/disable flag is signaled in sequence parameter set (or SPS). Only if this triangle prediction tool enable/disable flag is true, the triangle prediction flag is signaled at CU level. Secondly, triangle prediction tool is only allowed in B-slice. So only in a B-slice, the triangle prediction flag is signaled at CU level. Thirdly, triangle prediction mode is signaled only for a CU with a size equal or larger than a certain threshold. If a CU has a size smaller than that threshold, triangle prediction flag is not signaled. Fourthly, triangle prediction flag is only signaled for a CU if that CU is not coded in sub-block merge mode which includes both affine mode and ATMVP mode.

In the four cases listed above, when triangle prediction flag is not signaled, it is inferred as 0 at the decoder side.

When triangle prediction flag is signaled, it is signaled using Context-adaptive binary arithmetic coding (CABAC) entropy coder with certain contexts. The contexts are formed based on the triangle prediction flag values of the top and the left block to the current CU.

To code (i.e. either encoder or decode) a triangle prediction flag for a current block (or a current CU), triangle prediction flag from both the top and the left block (or CU) are derived and their values are summed up. This results in three possible contexts corresponding to the following cases:
1) Both the left block and the top block have a triangle prediction flag of 0;
2) Both the left block and the top block have a triangle prediction flag of 1;
3) Otherwise.

Separate probabilities are maintained for each of the three contexts. Once a context value is determined for a current block, the triangle prediction flag of the current block is coded using the CABAC probability model corresponding to that context value.

If the triangle prediction flag is true, a triangle partition orientation flag is signaled to indicate if the partition is orientated from the top-left corner to the bottom-right corner or from the top-right corner to the bottom-left corner.

Then two merge index values are signaled to indicate the merge index values of the first and the second uni-prediction merge candidate respectively for triangle prediction. These two merge index values are used to locate two merge candidates from the uni-prediction motion vector candidate list described above, for the first and second partition, respectively. For triangle prediction, the two merge index values are required to be different so that the two predictors of the two triangular partitions may be different from each other. As a result, the first merge index value is signaled directly. To signal the second merge index value, if it is smaller than the first merge index value, its value is signaled directly. Otherwise, its value is subtracted by 1 before being signaled to decoder. At the decoder side, the first merge index is decoded and used directly. To decode the second merge index value, a value denoted as "idx" is firstly decoded from CABAC engine. The second merge index value would be equal to the value of idx if idx is smaller than the first merge index value. Otherwise, the second merge index value would be equal to (idx+1).

Regular Merge Mode Motion Vector Candidate List

According to the current VVC, under the regular merge mode where a whole CU is predicted without splitting into more than one PU, the motion vector candidate list or the merge candidate list is constructed using a different procedure than that for the triangle prediction mode.

Figure 8:
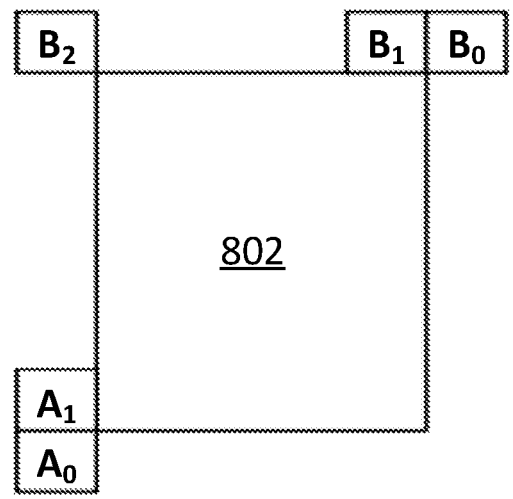
FIG. 8 is a schematic diagram illustrating positions of spatial merge candidates in accordance with some implementations of the present disclosure.

Firstly, spatial motion vector candidates are selected based on motion vectors from neighboring blocks as indicated in FIG. 8, which is a schematic diagram illustrating positions of spatial merge candidates in accordance with some implementations of the present disclosure. In the derivation of spatial merge candidates of a current block 802, a maximum of four merge candidates are selected among candidates that are located in positions as depicted in FIG. 8. The order of derivation is $A_1 \rightarrow B_1 \rightarrow B_0 \rightarrow A_0 \rightarrow (B_2)$. The position $B_2$ is considered only when any PU of positions $A_1$, $B_1$, $B_0$, $A_0$ is not available or is intra coded.

Figure 9:
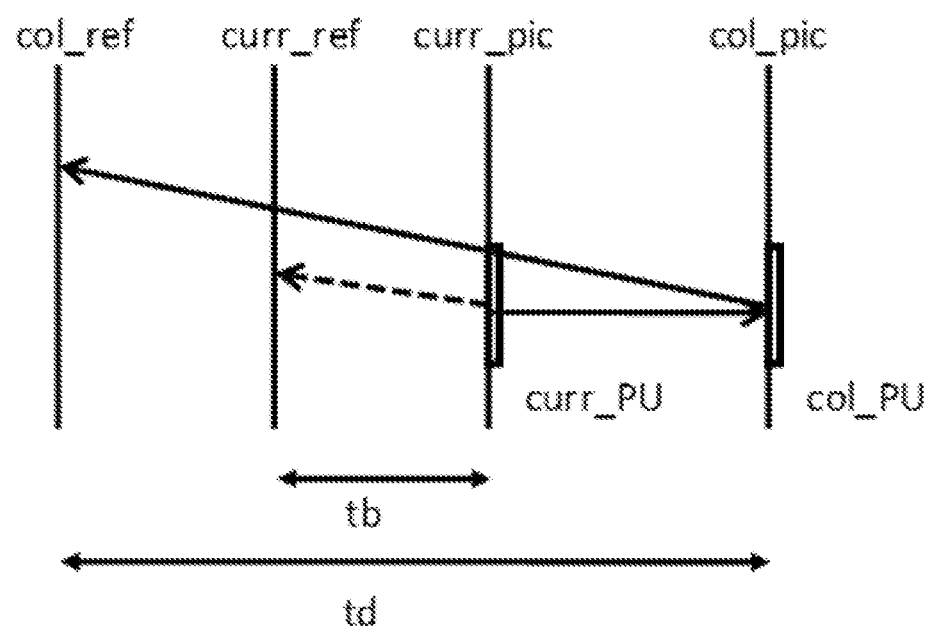
FIG. 9 is a schematic diagram illustrating motion vector scaling for a temporal merge candidate in accordance with some implementations of the present disclosure.

Next, a temporal merge candidate is derived. In the derivation of the temporal merge candidate, a scaled motion vector is derived based on the co-located PU belonging to the picture which has the smallest Picture Order Count (POC) difference with the current picture within the given reference picture list. The reference picture list to be used for derivation of the co-located PU is explicitly signaled in the slice header. The scaled motion vector for the temporal merge candidate is obtained as illustrated by the dotted line in FIG. 9 which illustrates motion vector scaling for the temporal merge candidate in accordance with some implementations of the present disclosure. The scaled motion vector for the temporal merge candidate is scaled from the motion vector of the co-located PU col_PU using the POC distances, tb and td, where tb is defined to be the POC difference between the reference picture of the current picture curr_ref and the current picture curr_pic and td is defined to be the POC difference between the reference picture of the co-located picture col_ref and the co-located picture col_pic. The reference picture index of the temporal merge candidate is set equal to zero. A practical realization of the scaling process is described in the HEVC draft specification. For a B-slice, two motion vectors, one for reference picture List 0 and the other for reference picture List 1, are obtained and combined to make the bi-predictive merge candidate.

Figures 10, 13:
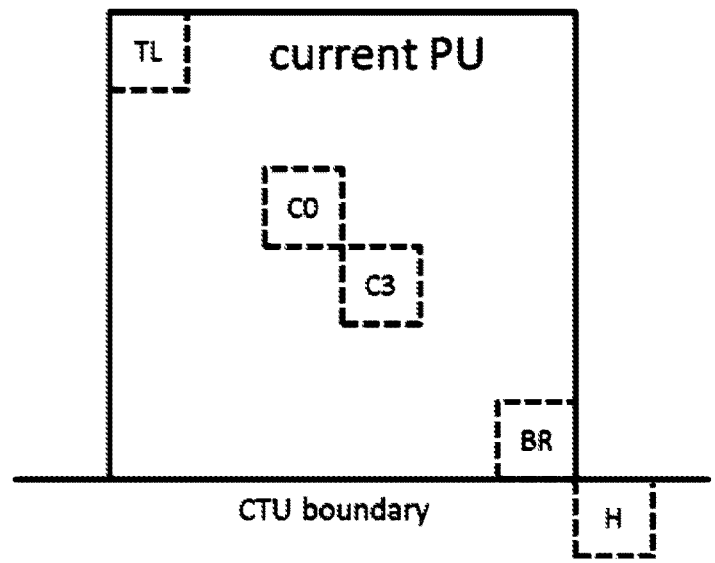
FIG. 10 is a schematic diagram illustrating candidate positions for a temporal merge candidate in accordance with some implementations of the present disclosure.
FIG. 13 is a schematic diagram illustrating an example of uni-prediction MV selection for triangle prediction mode in accordance with some implementations of the present disclosure.

FIG. 10 is a schematic diagram illustrating candidate positions for the temporal merge candidate in accordance with some implementations of the present disclosure.

The position of co-located PU is selected between two candidate positions, C3 and H, as depicted in FIG. 10. If the PU at position H is not available, or is intra coded, or is outside of the current CTU, position C3 is used for the derivation of the temporal merge candidate. Otherwise, position H is used for the derivation of the temporal merge candidate.

After inserting both spatial and temporal motion vectors into the merge candidate list as described above, history-based merge candidates are added. The so-called history-based merge candidates include those motion vectors from previously coded CUs, which are maintained in a separate motion vector list, and managed based on certain rules.

After inserting history-based candidates, if the merge candidate list is not full, pairwise average motion vector candidates are further added into the list. As its name indicates, this type of candidates is constructed by averaging candidates already in the current list. More specifically, based on a certain order or rule, two candidates in the merge candidate list are taken each time and the average motion vector of the two candidates is appended to the current list.

After inserting pairwise average motion vectors, if the merge candidate list is still not full, zero motion vectors will be added to make the list full.

Using Regular Merge List Construction Process to Construct a First Merge List for Triangle Prediction The triangle prediction mode in the current VVC shares some similarities with the regular merge prediction mode, in its overall procedures in forming a predictor. For example, under both prediction modes, a merge list needs to be constructed based on at least the current CU's neighboring spatial motion vectors and the co-located motion vectors. At the same time, the triangle prediction mode also has some aspects that are different from the regular merge prediction mode.

For example, although a merge list needs to be constructed under both the triangle prediction mode and the regular merge prediction mode, the detailed procedures of obtaining such a list are different.

These differences incur additional cost to codec implementation as additional logics are needed. The procedures and logics of constructing a merge list may be unified and shared between the triangle prediction mode and the regular merge prediction mode.

In some examples, in forming the uni-directional prediction (also called uni-prediction) merge list for the triangle prediction mode, before adding a new motion vector into the merge list, the new motion vector is fully pruned against those motion vectors already in the list. In other words, the new motion vector is compared with each motion vector that is already in the uni-prediction merge list, and is added into the list only when it is different from every motion vector in that merge list. Otherwise, the new motion vector is not added into the list.

According to some examples of the present disclosure, under the triangle prediction mode, the uni-directional prediction merge list may be obtained or constructed from the regular merge mode motion vector candidate list, which may be referred to as a regular merge list.

More specifically, to construct a merge candidate list for the triangle prediction mode, a first merge list is firstly constructed based on the merge list construction process for the regular merge prediction. The first merge list including a plurality of candidates, each being a motion vector. Then, the uni-directional prediction merge list for the triangle prediction mode is further constructed or derived using the motion vectors in the first merge list.

It should be noted that the first merge list constructed in this case may choose a different list size than that for the general merge mode or regular merge mode. In one example of the present disclosure, the first merge list has the same size as that for the general merge mode. In another example of the present disclosure, the first merge list constructed has a list size different from that for the general merge mode.

Constructing Uni-Directional Prediction Merge List from the First Merge List

According to some examples of the present disclosure, the uni-directional prediction merge list for triangle prediction mode may be constructed or derived from the first merge list based on one of the following methods.

In an example of the present disclosure, to construct or derive the uni-directional prediction merge list, prediction List 0 motion vectors of the candidates in the first merge list are checked and selected into the uni-directional prediction merge list first. If the uni-directional prediction merge list is not full (e.g., the number of candidates in this list is still less than the target number) after this process, prediction List 1 motion vectors of the candidates in the first merge list are checked and selected into the uni-directional prediction merge list. If the uni-directional prediction merge list is still not full, prediction List 0 zero vectors are added into the uni-directional prediction merge list. If the uni-directional prediction merge list still not full, prediction List 1 zero vectors are added into the uni-directional prediction merge list.

In another example of the present disclosure, for each candidate in the first merge list, its prediction List 0 motion vector and prediction List 1 motion vector are added in an interleaving manner into the uni-directional prediction merge list. More specifically, for each candidate in the first merge list, if a candidate is a uni-directional prediction motion vector, it is added directly into the uni-directional prediction merge list. Otherwise, if the candidate is a bi-directional prediction motion vector in the first merge list, its prediction List 0 motion vector is first added into the uni-directional prediction merge list, followed by its prediction List 1 motion vector. Once all motion vector candidates in the first merge list are checked and added, but the uni-directional prediction merge list is not full yet, uni-directional prediction zero motion vectors may be added. For example, for each reference frame index, a prediction List 0 zero motion vector and a prediction List 1 zero motion vector may be separately added into the uni-directional prediction merge list until the list is full.

In yet another example of the present disclosure, the uni-directional prediction motion vectors from the first merge list are selected into the uni-directional prediction merge list first. If the uni-directional prediction merge list is not full after this process, for each bi-directional prediction motion vectors in the first merge list, its prediction List 0 motion vector is first added into the uni-directional prediction merge list, followed by its prediction List 1 motion vector. After this process, if the uni-directional prediction merge list is not full yet, uni-directional prediction zero motion vectors may be added. For example, for each reference frame index, a prediction List 0 zero motion vector and a prediction List 1 zero motion vector may be separately added into the uni-directional prediction merge list until the list is full.

In the descriptions above, when a uni-directional prediction motion vector is added into the uni-directional prediction merge list, a motion vector pruning process may be performed to make sure that the new motion vector to be added is different from those motion vectors already in the uni-directional prediction merge list. Such motion vector pruning process may also be performed in a partial manner for lower complexity, e.g., checking the new motion vector to be added only against some but not all motion vectors already in the uni-directional prediction merge list. In an extreme case, no motion vector pruning (i.e., motion vector comparison operation) is performed in the process.

Constructing Uni-Directional Prediction Merge List from the First Merge List Based on Picture Prediction Configuration In some examples of the present disclosure, the uni-prediction merge list may be constructed in an adaptive manner based on whether a current picture uses backward prediction. For example, the uni-prediction merge list may be constructed using different methods depending on whether a current picture uses backward prediction. If the Picture Order Count (POC) values of all the reference pictures are not greater than the current picture's POC value, it means that the current picture does not use backward prediction.

In an example of the present disclosure, when a current picture does not use backward prediction, or upon determining that the current picture does not use backward prediction, prediction List 0 motion vectors of the candidates in the first merge list are checked and selected into the uni-directional prediction merge list first, followed by prediction List 1 motion vectors of those candidates; and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In another example of the present disclosure, if a current picture does not use backward prediction, prediction List 1 motion vectors of the candidates in the first merge list are checked and selected into the uni-directional prediction merge list first, followed by prediction List 0 motion vectors of those candidates; and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In yet another example of the present disclosure, if a current picture does not use backward prediction, only prediction List 0 motion vectors of the candidates in the first merge list are checked and selected into the uni-directional prediction merge list first, and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In still another example of the present disclosure, if a current picture does not use backward prediction, only prediction List 1 motion vectors of the candidates in the first merge list are checked and selected into the uni-directional prediction merge list first, and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In another example of the disclosure, when a current picture does not use backward prediction, prediction List 0 motion vectors of the candidates in the first merge list are used as the uni-directional prediction merge candidates, indexed according to the same index order as they are in the first merge list. Otherwise if the current picture uses backward prediction, List 0 and List 1 motion vectors of each candidate in the first merge list are used as the uni-directional prediction merge candidates, indexed based on an interleaving manner as described above, i.e. List 0 motion vector of the first candidate in the first merge list, followed by List 1 motion vector of the first candidate, then List 0 motion vector of the second candidate, then List 1 motion vector of the second candidate, and so on. In case a candidate in the first merge list is uni-directional motion vector, a zero motion vector is indexed in the uni-directional prediction merge list following that candidate. This makes sure that for the case the current picture uses backward prediction, each candidate in the first merge list, regardless it is bi-directional or uni-directional prediction motion vector, can provide two uni-directional motion vectors as the uni-directional prediction merge candidates.

In another example of the disclosure, when a current picture does not use backward prediction, prediction List 0 motion vectors of the candidates in the first merge list are used as the uni-directional prediction merge candidates, indexed according to the same index order as they are in the first merge list. Otherwise, if the current picture uses backward prediction, List 0 and List 1 motion vectors of each candidate in the first merge list are used as the uni-directional prediction merge candidates, indexed based on an interleaving manner as described above, i.e. List 0 motion vector of the first candidate in the first merge list, followed by List 1 motion vector of the first candidate, then List 0 motion vector of the second candidate, then List 1 motion vector of the second candidate, and so on. In case a candidate in the first merge list is uni-directional motion vector, a same motion vector plus certain motion offset is indexed in the uni-directional prediction merge list following that candidate.

In the descriptions above, although it is described as selecting motion vectors from the first merge list into a uni-directional prediction merge list, the method may be implemented in different ways in practice, with or without the uni-directional prediction merge list being physically formed. For example, the first merge list may be used directly without physically creating a uni-directional prediction merge list. For example, those List 0 and/or List 1 motion vectors of each candidate in the first merge list may be simply indexed based on certain order and accessed directly from the first merge list. It should be noted such an order of indexing may follow the same selecting order described in those examples above. This means that given a merge index for a PU coded with triangle prediction mode, its corresponding uni-prediction merge candidate may be obtained directly from the first merge list without the uni-directional prediction merge list being physically formed.

In this process, when checking a new motion vector to be added into the list, pruning may be performed fully, or partially. When it is performed partially, it means the new motion vector is compared against some, but not all, of the motion vectors that are already in the uni-prediction merge list. In the extreme case, no motion vector pruning (i.e. motion vector comparison operation) is performed in the process.

Such motion vector pruning may also be performed adaptively in forming the uni-prediction merge list, based on whether the current picture uses backward prediction or not. For example, for all the examples of the present disclosure in this section described above, when the current picture does not use backward prediction, motion vector pruning operation is performed, either fully or partially. When the current picture uses backward prediction, motion vector pruning operation is not performed in forming the uni-prediction merge list.

Using the First Merge List for Triangle Prediction without Creating Uni-Directional Prediction Merge List In the above examples, a uni-directional prediction merge list for triangle prediction is constructed by selecting motion vectors from the first merge list into the uni-directional prediction merge list. However, in practice, the methods may be implemented in different ways, with or without the uni-directional prediction (or uni-prediction) merge list being physically formed. In some examples, the first merge list may be used directly without physically creating a uni-directional prediction merge list. For example, the List 0 and/or List 1 motion vectors of each candidate in the first merge list may be simply indexed based on a certain order and accessed directly from the first merge list.

For example, the first merge list may be obtained from a decoder or other electronic devices/components. In other examples, after constructing the first merge list which includes a plurality of candidates, each being one or more motion vectors, based on a merge list construction process for regular merge prediction, a uni-directional prediction merge list is not constructed, but instead, a pre-defined index listing including a plurality of reference indices, each reference index being a reference to a motion vector of a candidate in the first merge list, is used for deriving uni-directional merge candidates for the triangle prediction mode. The index listing may be considered as a representation of a uni-directional prediction merge list for the triangular prediction, and the uni-directional prediction merge list includes at least a subset of candidates in the first merge list corresponding to the reference indices. It should be noted that an order of indexing may follow any of the selecting orders described in the examples in which a uni-directional prediction merge list is constructed. In practice, such index listing may be implemented in different manners. For example, it may be implemented as a list explicitly. In other examples, it may also be implemented or obtained in certain logics and/or program functions without explicitly forming any list.

In some examples of the present disclosure, the index listing may be determined in an adaptive manner based on whether a current picture uses backward prediction. For example, the reference indices in the index listing may be arranged depending on whether a current picture uses backward prediction, i.e., based on a comparison result of a Picture Order Count (POC) of a current picture and POCs of reference pictures. If the Picture Order Count (POC) values of all the reference pictures are not greater than the current picture's POC value, it means that the current picture does not use backward prediction.

In one example of the present disclosure, when a current picture does not use backward prediction, prediction List 0 motion vectors of the candidates in the first merge list are used as the uni-directional prediction merge candidates, indexed according to the same index order as they are in the first merge list. That is, upon determining that the POC of the current picture is greater than each one of the POCs of the reference pictures, the reference indices are arranged according to a same order of List 0 motion vectors of the candidates in the first merge list. Otherwise, if the current picture uses backward prediction, List 0 and List 1 motion vectors of each candidate in the first merge list are used as the uni-directional prediction merge candidates, indexed based on an interleaving manner, i.e., List 0 motion vector of the first candidate in the first merge list followed by List 1 motion vector of the first candidate, and then List 0 motion vector of the second candidate followed by List 1 motion vector of the second candidate, and so on. That is, upon determining that the POC of the current picture is smaller than at least one of the POCs of the reference pictures, the reference indices are arranged according to an interleaving manner of List 0 and List 1 motion vectors of each candidate in the first merge list, where the candidate is a bi-directional prediction motion vector. In the case where a candidate in the first merge list is a uni-directional motion vector, a zero motion vector is indexed as the uni-directional prediction merge candidate following the motion vector of that candidate. This ensures that for the case where the current picture uses backward prediction, each candidate in the first merge list, regardless it is a bi-directional or uni-directional prediction motion vector, provides two uni-directional motion vectors as the uni-directional prediction merge candidates.

In another example of the present disclosure, when a current picture does not use backward prediction, prediction List 0 motion vectors of the candidates in the first merge list are used as the uni-directional prediction merge candidates, indexed according to the same index order as they are in the first merge list. Otherwise, if the current picture uses backward prediction, List 0 and List 1 motion vectors of each candidate in the first merge list are used as the uni-directional prediction merge candidates, indexed based on an interleaving manner as described above, i.e., List 0 motion vector of the first candidate in the first merge list followed by List 1 motion vector of the first candidate, and then List 0 motion vector of the second candidate followed by list 1 motion vector of the second candidate, and so on. In the case where a candidate in the first merge list is a uni-directional motion vector, the motion vector plus certain motion offset is indexed as the uni-directional prediction merge candidate following the motion vector of the candidate.

Thus, in the case where a candidate in the first merge list is a uni-directional motion vector, upon determining that the POC of the current picture is smaller than at least one of the POCs of the reference pictures, the reference indices are arranged according to an interleaving manner of: a motion vector of each candidate in the first merge list, and a zero motion vector, or the motion vector plus an offset.

In the above processes, when checking a new motion vector to be added into the uni-directional prediction merge list, pruning may be performed fully, or partially. When it is performed partially, it means that the new motion vector is compared against some, but not all, of the motion vectors that are already in the uni-prediction merge list. In an extreme case, no motion vector pruning (i.e. motion vector comparison operation) is performed in the process.

The motion vector pruning may also be performed adaptively in forming the uni-prediction merge list, based on whether the current picture uses backward prediction or not. For example, for the examples of the present disclosure relating to index listing determination based on picture prediction configuration, when the current picture does not use backward prediction, motion vector pruning operation is performed, either fully or partially. When the current picture uses backward prediction, motion vector pruning operation is not performed.

Selecting Uni-Prediction Merge Candidates for Triangle Prediction Mode

In addition to the abovementioned examples, other ways of uni-prediction merge list construction or uni-prediction merge candidate selection are disclosed.

In one example of the present disclosure, once the first merge list for the regular merge mode is constructed, uni-prediction merge candidates may be selected for triangle prediction according to the following rules:

for a motion vector candidate in the first merge list, one and only one of its List 0 or List 1 motion vector is used for triangle prediction;

for a given motion vector candidate in the first merge list, if its merge index value in the list is an even number, its List 0 motion vector is used for triangle prediction if it is available, and in the case that this motion vector candidate does not have a List 1 motion vector, its List 0 motion vector is used for triangle prediction; and for a given motion vector candidate in the first merge list, if its merge index value in the list is an odd number, its List 1 motion vector is used for triangle prediction if it is available, and in the case that this motion vector candidate does not have a List 1 motion vector, its List 0 motion vector is used for triangle prediction.

FIG. 11A shows an example of uni-prediction motion vector (MV) selection (or uni-prediction merge candidate selection) for triangle prediction mode. In the example, the first 5 merge MV candidates derived in the first merge list are indexed from 0 to 4; and each row has two columns, representing the List 0 and the List 1 motion vector respectively for a candidate in the first merge list. Each candidate in the list may be either uni-predicted or bi-predicted. For a uni-predicted candidate, it has only a List 0 or a List 1 motion vector, but not both. For a bi-predicted candidate, it has both List 0 and List 1 motion vectors. In FIG. 11A, for each merge index, the motion vectors marked with "x" are those motion vectors to be used first for triangle prediction if they are available. If a motion vector marked in "x" is not available, the unmarked motion vector corresponding to the same merge index is then to be used for triangle prediction. In other words, according to this method, given a merge index value for a PU coded under triangle prediction mode, the index value may be used directly to locate a merge candidate in the first merge list; then depending on the parity of the index value (i.e. if it is an even or odd number), a List 0 or a List 1 motion vector of the located merge candidate in the first merge list is selected for the PU based on the rules described above. There is no need for a uni-directional prediction merge list being physically formed in this process.

The above concept may be extended to other examples. FIG. 11B shows another example of uni-prediction motion vector (MV) selection for triangle prediction mode. According to FIG. 11B, the rules for selecting uni-prediction merge candidates for triangle prediction are as follows:

for a motion vector candidate in the first merge list, one and only one of its List 0 or List 1 motion vector is used for triangle prediction;

for a given motion vector candidate in the first merge list, if its merge index value in the list is an even number, its List 1 motion vector is used for triangle prediction if it is available, and in the case that this motion vector candidate does not have a List 1 motion vector, its List 0 motion vector is used for triangle prediction; and for a given motion vector candidate in the first merge list, if its merge index value in the list is an odd number, its List 0 motion vector is used for triangle prediction if it is available, and in the case that this motion vector candidate does not have a List 0 motion vector, its List 1 motion vector is used for triangle prediction.

In some examples, other different orders may be defined and used for selecting uni-prediction merge candidates for triangle prediction from those motion vector candidates in the first merge list. More specifically, for a given motion vector candidate in the first merge list, the decision of whether its List 0 or List 1 motion vector is used first when available for triangle prediction does not have to be dependent on the parity of the candidate's index value in the first merge list as described above. For examples, the following rules may also be used:

for a motion vector candidate in the first merge list, one and only one of its List 0 or List 1 motion vector is used for triangle prediction;

based on a certain pre-defined pattern, for a number of motion vector candidates in the first merge list, their List 0 motion vector are used for triangle prediction if available, and in the case that a List 0 motion vector does not exist, the corresponding List 1 motion vector is used for triangle prediction; and based on the same pre-defined pattern, for the remaining motion vector candidates in the first merge list, their List 1 motion vector are used for triangle prediction if available, and in the case that a List 1 motion vector does not exist, the corresponding List 0 motion vector is used for triangle prediction.

FIGS. 12A to 12D show some examples of the pre-defined patterns in uni-prediction motion vector (MV) selection for triangle prediction mode. For each merge index, the motion vectors marked with "x" are those motion vectors used first for triangle prediction if they are available. If a motion vector marked in "x" is not available, the unmarked motion vector corresponding to the same merge index is then used for triangle prediction.

In FIG. 12A, for the first three motion vector candidates in the first merge list, their List 0 motion vectors are checked first. Only when a List 0 motion vector is not available, the corresponding List 1 motion vector is used for triangle prediction. For the fourth and fifth motion vector candidates in the first merge list, their List 1 motion vectors are checked first. Only when a List 1 motion vector is not available, the corresponding List 0 motion vector is used for triangle prediction. FIGS. 12B to 12D show three other patterns in selecting uni-prediction merge candidates from the first merge list. The examples shown in the figures are not limiting, and there exist further examples. For instance, the horizontally and/or vertically mirrored versions of those patterns shown in FIGS. 12A to 12D may also be used.

The selected uni-prediction merge candidates may be indexed and accessed directly from the first merge list; or these selected uni-prediction merge candidates may be put into a uni-prediction merge list for triangle prediction. The derived uni-prediction merge list includes a plurality of uni-prediction merge candidates, and each uni-prediction merge candidate includes one motion vector of a corresponding candidate in the first merge list. According to some examples of the present disclosure, each candidate in the first merge list includes at least one of a List 0 motion vector and a List 1 motion vector, and each uni-prediction merge candidate may be a single one of the List 0 and List 1 motion vectors of the corresponding candidate in the first merge list. Each uni-prediction merge candidate is associated with a merge index of integer value; and the List 0 and List 1 motion vectors are selected based on a preset rule for the uni-prediction merge candidates.

In one example, for each uni-prediction merge candidate having an even merge index value, a List 0 motion vector of the corresponding candidate with the same merge index in the first merge list is selected as the uni-prediction merge candidate; and for each uni-prediction merge candidate having an odd merge index value, a List 1 motion vector of the corresponding candidate with the same merge index in the first merge list is selected. In another example, for each uni-prediction merge candidate having an even merge index value, a List 1 motion vector of the corresponding candidate with the same merge index in the first merge list is selected; and for each uni-prediction merge candidate having an odd merge index value, a List 0 motion vector of the corresponding candidate with the same merge index in the first merge list is selected.

In yet another example, for each uni-prediction merge candidate, a List 1 motion vector of the corresponding candidate in the first merge list is selected as the uni-prediction merge candidate, upon determining that the List 1 motion vector is available; and a List 0 motion vector of the corresponding candidate in the first merge list is selected upon determining that the List 1 motion vector is not available.

In still another example, for each uni-prediction merge candidate having a merge index value within a first range, a List 0 motion vector of the corresponding candidate in the first merge list is selected as the uni-prediction merge candidate; and for each uni-prediction merge candidate having a merge index value within a second range, a List 1 motion vector of the corresponding candidate in the first merge list is selected.

Selecting Uni-Prediction Merge Candidates Directly from the First Merge List for Triangle Prediction Mode FIG. 13 shows another example of the disclosure. Once the first merge list for the regular merge mode is constructed, uni-prediction motion vector is selected for triangle prediction directly from that list. To indicate a certain List 0 or List 1 motion vector that is used for triangle prediction, first an index value is signaled to indicate which candidate from the first merge list is chosen. Then a binary reference list indication flag referred as L0L1_flag in the following description, is signaled to indicate if the List 0 or the List 1 motion vector of that chosen candidate from the first merge list is selected for the first partition of triangle prediction. The same signaling method is used to indicate a second List 0 or List 1 motion vector to be used for the second partition of triangle prediction. For example, the syntaxes signaled for a triangle-mode-coded CU may include index1, L0L1_flag1, index2, L0L1_flag2. Here, index1 and index2 are the merge index values of the two candidates selected from the first merge list for the first and the second partition, respectively. L0L1_flag1 is the binary flag for the first partition to indicate if the List 0 or List 1 motion vector of the chosen candidate based on index1 from the first merge list is selected. L0L1_flag2 is the binary flag for the second partition to indicate if the List 0 or List 1 motion vector of the chosen candidate based on index2 from the first merge list is selected. It is worth mentioning that in practice, different signaling orders of the syntaxes mentioned above may be used according to the method of the disclosure. In one example, the signaling order may follow index1→L0L1_flag1→index2→L0L1_flag2; in another example, the signaling order may follow index1→index2→L0L1_flag1→L0L1_flag2; etc.

In the signaling method above, every List 0 and/or List 1 motion vector as indicated with a symbol "x" in a rectangular box in FIG. 13 may be indicated/signaled to decoder for deriving prediction for the first partition, and also every List 0 and/or List 1 motion vector indicated with a symbol "x" in a rectangular box in FIG. 13 may be indicated/signaled to decoder for deriving prediction for the second partition under triangle prediction mode. As a result, the selection of uni-prediction motion vector from the first merge list becomes very flexible. Given a first merge list with a size of N candidates, up to 2N uni-prediction motion vectors may be used for each of the two triangular partitions.

The two merge index values for the two partitions under triangle prediction mode do not have to be different from each other. In other words, they may take the same value. The index values are signaled directly without adjustment before signaling. More specifically, unlike what's currently defined in VVC, the second index value is signaled to decoder directly without performing any adjustment to the value prior to signaling.

In another example of the disclosure, when the two index values are the same, the binary flag for the second partition, L0L1_flag2, does not have to be signaled. Instead, it is inferred as having the contrary value relative to the binary flag for the first partition, L0L1_flag1. In other words, in this case L0L1_flag2 may take a value of (1−L0L1_flag1).

In another example of the disclosure, L0L1_flag1 and L0L1_flag2 may be coded as CABAC context bins. The context used for L0L1_flag1 may be separate from the context used for L0L1_flag2. The CABAC probability under each context may be initialized at the beginning of a video sequence, and/or at the beginning of a picture, and/or at a beginning of a tile group. Under this example of the disclosure, different context modeling methods may be used for coding these two flags. In one method, the context model selection for the second flag may be dependent on the value of the first flag. In other words, at least two context models may be used for coding the second flag, with the context model selected based on the value of the signaled first flag. In another method, the CABAC probability under each context model may be initialized differently depending on whether a current picture uses backward prediction or not. In case a picture uses backward prediction, the probability may be initialized higher for the flag to indicate a certain list motion vector is selected, e.g. List 0 or List 1. In one example, if a picture does not use backward prediction, a higher initial probability is used for the flag to indicate a List 0 motion vector is selected than in the case a picture uses backward prediction. In other words, the initial probability may be defined based on whether a picture uses backward prediction or not, to accommodate that fact that when a picture does not use backward prediction, List 0 motion vector of those candidates may be more likely to be chosen in geometric prediction. In yet another method, the first flag may be coded as a bypass bin (i.e. a CABAC coded bin with equal probability of being 0 or being 1), and only the second flag is coded as a context bin. It is worth noting that the methods mentioned here can be used either separately or jointly.

In another example of the disclosure, when a motion vector indicated by a merge index value and the associated L0L1_flag does not exist, a uni-prediction zero motion vector may be used instead.

In another example of the disclosure, when a motion vector indicated by a merge index value and the associated L0L1_flag does not exist, the corresponding motion vector indicated by the same merge index value but from the other list, i.e. List (1−L0L1_flag), may be used instead.

In another example of the disclosure, for a triangle-mode-coded CU, the second L0L1_flag (i.e. L0L1_flag2) associated with the second index (i.e. index2) is not signaled but always inferred. In this case, the index1, L0L1_flag1 and index2 syntaxes still need to be signaled. In one method, the inference of L0L1_flag2 is based on the value of the L0L1_flag1 and whether a current picture uses backward prediction. More specifically, for a triangle-mode-coded CU, if the current picture uses backward prediction, the value of L0L1_flag2 is inferred to be the opposite binary value of L0L1_flag1 (i.e. 1−L0L1_flag1); if the current picture does not use backward prediction, the value of L0L1_flag2 is inferred to be the same as L0L1_flag1. Additionally, if the current picture does not use backward prediction, it may be further enforced that the value of index2 is different from the value of index1 because both the two motion vectors (with one for each triangle partition) are coming from the same prediction list. If index2 has a value equal to index1, it means that the same motion vector would be used for both triangle partitions, which is not useful from coding efficiency perspective. In this case, in signaling the value of index2, a corresponding adjustment to the value of index2 prior to index binarization may be performed, which is the same as in the current VVC design for index2 signaling. For example, in case the actual value of index1 is smaller than that of index2, a CABAC binarization codeword corresponding to (index2−1) is used to signal the value of index2; otherwise, a CABAC binarization codeword corresponding to index2 is used to signal the value of index2. Correspondingly, at the decoder end, if the signaled index2 value is smaller than the signaled index1 value, the actual value of index2 is set equal to the signaled index2 value; otherwise, the actual value of index2 is adjusted to be equal to the signaled index2 value plus one. It is worth mentioning based on this new example of the disclosure, alternatively the enforcement of index2 having a different value from index1 can also be applied to the case when the current picture uses backward prediction, together with the same index2 value adjustment for CABAC binarization.

In another example of the disclosure, for a triangle-mode-coded CU, none of the L0L1_flags are signaled. Instead they are both inferred. In this case, the index1 and index2 syntaxes still need to be signaled, representing the merge index values of the two candidates selected from the first merge list for the first and the second partition, respectively. Given a merge candidate index value, certain methods may be defined in determining if the List 0 motion vector or the List 1 motion vector of the corresponding merge candidate from the first list is selected for triangle mode prediction. In one method, for index1, the pattern shown in FIG. 11A is used in determining from which prediction list a motion vector of a merge candidate is selected for triangle mode prediction; and for index2, the pattern shown in FIG. 11B is used in determining from which prediction list a motion vector of a merge candidate is selected for triangle mode prediction. In other words, if index1 is an even value, List 0 motion vector is selected, and if index1 is an odd value, List 1 motion vector is selected. For index2, if it is an even value, List 1 motion vector is selected, and if it is an odd value, List 0 motion vector is selected. In case a motion vector corresponding to certain prediction list does not exist, some default motion vector may be used instead, e.g. a zero motion vector, or the motion vector of the corresponding candidate from the other prediction list, etc. It is worth mentioning that the current disclosure also covers the case where the pattern shown in FIG. 11A is used for index2 and FIG. 11B is used for index1, in determining from which prediction list a motion vector of a merge candidate is selected for triangle mode prediction.

In the above processes, although a first merge list containing 5 merge candidates is used in all the examples in this disclosure for illustration, in practice the size of the first merge list may be defined differently, e.g. 6, or 4, or some other values. All the methods described in this disclosure are equally applicable to the cases when the first merge list has a size other than 5.

In the above processes, motion vector pruning may be performed as well. Such pruning may be done fully, or partially. When it is performed partially, it means a new motion vector is compared against some, but not all, of the motion vectors that are already in the uni-prediction merge list. It may also mean that only some, but not all, new motion vectors need to be checked for pruning before used as merge candidates for triangle prediction. One specific example is that only the second motion vector is checked against the first motion vector for pruning before it is used as a merge candidate for triangle prediction, while all other motion vectors are not checked for pruning. In the extreme case, no motion vector pruning (i.e. motion vector comparison operation) is performed in the process.

Although the methods of forming a uni-prediction merge list in this disclosure are described with respect to triangle prediction mode, these methods are applicable to other prediction modes of similar kinds. For example, under the more general geometric partition prediction mode wherein a CU is partitioned into two PUs along a line not exactly diagonal, the two PUs may have a geometric shape such as triangle, wedge, or trapezoid shapes. In such cases, prediction of each PU is formed in a similar manner as in the triangle prediction mode, the methods described herein are equally applicable.

Figure 14:
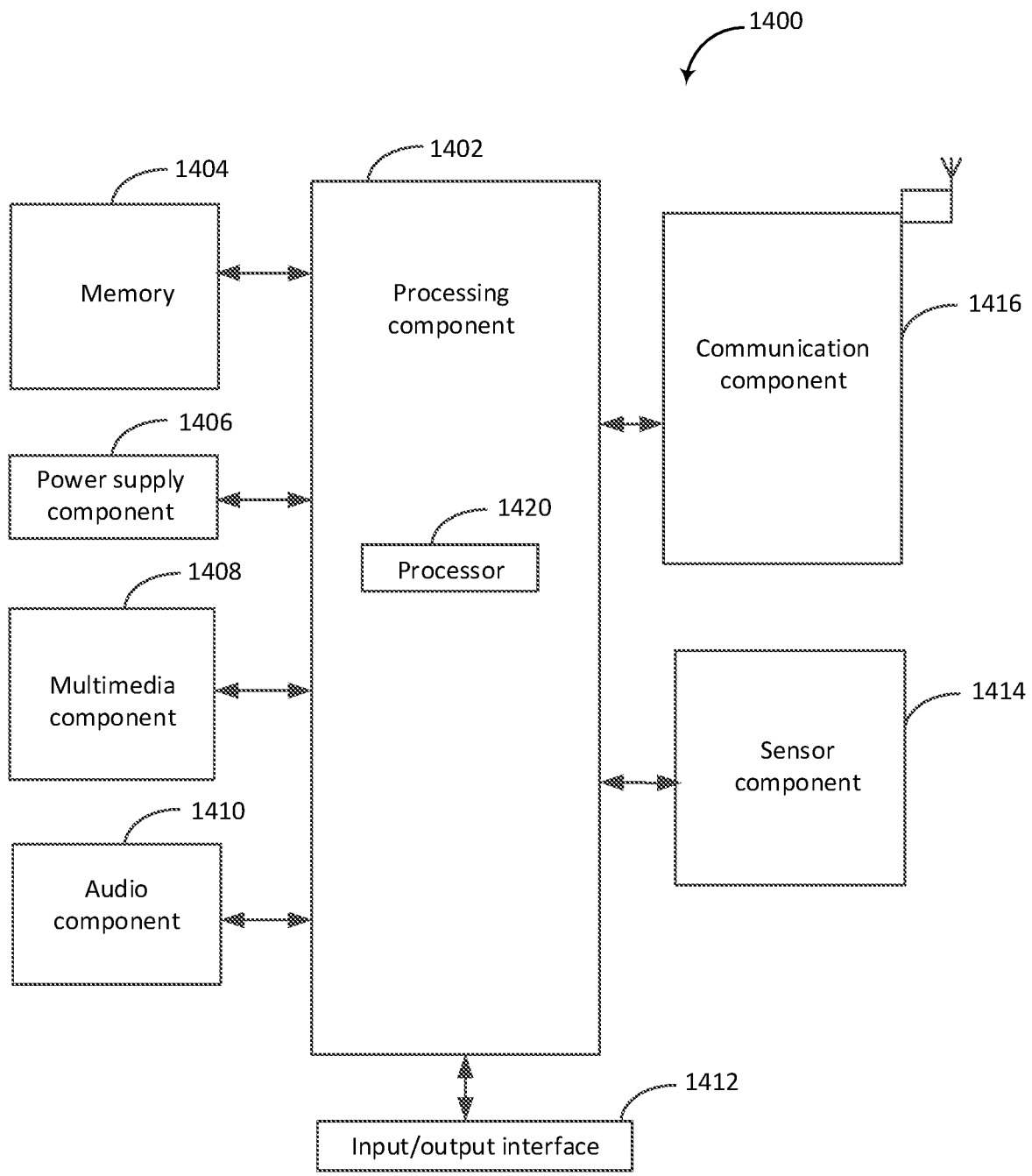
FIG. 14 is a block diagram illustrating an exemplary apparatus for video coding in accordance with some implementations of the present disclosure.

FIG. 14 is a block diagram illustrating an apparatus for video coding in accordance with some implementations of the present disclosure. The apparatus 1400 may be a terminal, such as a mobile phone, a tablet computer, a digital broadcast terminal, a tablet device, or a personal digital assistant.

As shown in FIG. 14, the apparatus 1400 may include one or more of the following components: a processing component 1402, a memory 1404, a power supply component 1406, a multimedia component 1408, an audio component 1410, an input/output (I/O) interface 1312, a sensor component 1314, and a communication component 1416.

The processing component 1402 usually controls overall operations of the apparatus 1400, such as operations relating to display, a telephone call, data communication, a camera operation and a recording operation. The processing component 1402 may include one or more processors 1420 for executing instructions to complete all or a part of steps of the above method. Further, the processing component 1402 may include one or more modules to facilitate interaction between the processing component 1402 and other components. For example, the processing component 1402 may include a multimedia module to facilitate the interaction between the multimedia component 1308 and the processing component 1402.

The memory 1404 is configured to store different types of data to support operations of the apparatus 1400. Examples of such data include instructions, contact data, phonebook data, messages, pictures, videos, and so on for any application or method that operates on the apparatus 1400. The memory 1404 may be implemented by any type of volatile or non-volatile storage devices or a combination thereof, and the memory 1404 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1406 supplies power for different components of the apparatus 1400. The power supply component 1306 may include a power supply management system, one or more power supplies, and other components associated with generating, managing and distributing power for the apparatus 1400.

The multimedia component 1408 includes a screen providing an output interface between the apparatus 1400 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1408 may include a front camera and/or a rear camera. When the apparatus 1400 is in an operation mode, such as a shooting mode or a video mode, the front camera and/or the rear camera may receive external multimedia data.

The audio component 1410 is configured to output and/or input an audio signal. For example, the audio component 1410 includes a microphone (MIC). When the apparatus 1400 is in an operating mode, such as a call mode, a recording mode and a voice recognition mode, the microphone is configured to receive an external audio signal. The received audio signal may be further stored in the memory 1404 or sent via the communication component 1416. In some examples, the audio component 1410 further includes a speaker for outputting an audio signal.

The I/O interface 1412 provides an interface between the processing component 1402 and a peripheral interface module. The above peripheral interface module may be a keyboard, a click wheel, a button, or the like. These buttons may include but not limited to, a home button, a volume button, a start button and a lock button.

The sensor component 1414 includes one or more sensors for providing a state assessment in different aspects for the apparatus 1400. For example, the sensor component 1414 may detect an on/off state of the apparatus 1400 and relative locations of components. For example, the components are a display and a keypad of the apparatus 1400. The sensor component 1414 may also detect a position change of the apparatus 1400 or a component of the apparatus 1400, presence or absence of a contact of a user on the apparatus 1400, an orientation or acceleration/deceleration of the apparatus 1400, and a temperature change of apparatus 1400. The sensor component 1414 may include a proximity sensor configured to detect presence of a nearby object without any physical touch. The sensor component 1414 may further include an optical sensor, such as a CMOS or CCD image sensor used in an imaging application. In some examples, the sensor component 1414 may further include an acceleration sensor, a gyroscope sensor, a magnetic sensor, a pressure sensor, or a temperature sensor.

The communication component 1416 is configured to facilitate wired or wireless communication between the apparatus 1400 and other devices. The apparatus 1400 may access a wireless network based on a communication standard, such as WiFi, 4G, or a combination thereof. In an example, the communication component 1416 receives a broadcast signal or broadcast related information from an external broadcast management system via a broadcast channel. In an example, the communication component 1416 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1400 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

FIG. 15 is a flowchart illustrating an exemplary process of video coding for motion compensated prediction using geometric prediction unit in accordance with some implementations of the present disclosure.

In step 1501, the processor 1420 partitions video pictures into a plurality of coding units (CUs), at least one of which is further partitioned into two prediction units (PUs). The two PUs may include at least one geometric shaped PU. For example, the geometric shaped PU may include a pair of triangular shaped PUs, a pair of wedge shaped PUs, or other geometric shaped PUs.

In step 1502, the processor 1420 constructs a first merge list including a plurality of candidates, each including one or more motion vector, a List 0 motion vector or a List 1 motion vector. For example, the processor 1420 may construct the first merge list based on a merge list construction process for regular merge prediction. The processor 1420 may obtain the first merge list from other electronic devices or storage as well.

In step 1503, the processor 1420 receives a signaled first index value to indicate a first candidate that is chosen from the first merge list.

In step 1504, the processor 1420 receives a signaled second index value to indicate a second candidate that is chosen from the first merge list.

In step 1505, the processor 1420 receives a signaled first binary flag that is coded using a first context-adaptive binary arithmetic coding (CABAC) context modeling method to indicate whether a List 0 motion vector of the first candidate or a List 1 motion vector of the first candidate is selected for a first PU of the geometric prediction.

In step 1506, the processor 1420 receives a signaled second binary flag that is coded using a second CABAC context modeling method to indicate whether a List 0 motion vector of the second candidate or a List 1 motion vector of the second candidate is selected for a second PU of the geometric prediction.

In some examples, there is provided an apparatus for video coding. The apparatus includes a processor 1420; and a memory 1404 configured to store instructions executable by the processor; where the processor, upon execution of the instructions, is configured to perform a method as illustrated in FIG. 15.

In some other examples, there is provided a non-transitory computer readable storage medium 1404, having instructions stored therein. When the instructions are executed by a processor 1420, the instructions cause the processor to perform a method as illustrated in FIG. 15.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video coding with geometric prediction, comprising:
    partitioning video pictures into a plurality of coding units (CUs), at least one of which is further partitioned into two prediction units (PUs) including at least one geometric shaped PU;
    constructing a first merge list comprising a plurality of candidates, based on a merge list construction process for regular merge prediction, wherein each one of the plurality of candidates is a motion vector comprising a List 0 motion vector, or a List 1 motion vector, or both;
    receiving a signaled first index value to indicate a first candidate that is chosen from the first merge list;
    receiving a signaled second index value to indicate a second candidate that is chosen from the first merge list;
    receiving a signaled first binary flag that is coded using a first context-adaptive binary arithmetic coding (CABAC) context modeling method to indicate whether a List 0 motion vector of the first candidate or a List 1 motion vector of the first candidate is selected for a first PU of the geometric prediction; and
    receiving a signaled second binary flag that is coded using a second CABAC context modeling method to indicate whether a List 0 motion vector of the second candidate or a List 1 motion vector of the second candidate is selected for a second PU of the geometric prediction,
    wherein the first CABAC context modeling method and the second CABAC context modeling method comprise:
    signaling each binary flag as a CABAC context bin, and a CABAC probability under each context model is initialized differently in response to whether a current picture uses a backward prediction.

2. The method for video coding with geometric prediction of claim 1, wherein at least two context models are available to decode the signaled second binary flag, with a context model selected based on a value of the signaled first binary flag.

3. The method for video coding with geometric prediction of claim 1, wherein the CABAC probability under each context model is initialized differently further comprises: using a higher CABAC initial probability for each binary flag to indicate selecting a List 0 motion vector in case the current picture does not use the backward prediction than in case the current picture uses the backward prediction.

4. The method for video coding with geometric prediction of claim 1, further comprising: decoding the first binary flag as a CABAC bypass bin, and decoding the second binary flag as a CABAC context coded bin.

5. An apparatus for video coding with geometric prediction, comprising:
    one or more processors; and
    a memory configured to store instructions executable by the one or more processors;
    wherein the one or more processors, upon execution of the instructions, are configured to:
    partition video pictures into a plurality of coding units (CUs), at least one of which is further partitioned into two prediction units (PUs) including at least one geometric shaped PU;
    construct a first merge list comprising a plurality of candidates, based on a merge list construction process for regular merge prediction, wherein each one of the plurality of candidates is a motion vector comprising a List 0 motion vector, or a List 1 motion vector, or both;
    receive a signaled first index value to indicate a first candidate that is chosen from the first merge list;
    receive a signaled second index value to indicate a second candidate that is chosen from the first merge list;
    receive a signaled first binary flag that is coded using a first context-adaptive binary arithmetic coding (CABAC) context modeling method to indicate whether a List 0 motion vector of the first candidate or a List 1 motion vector of the first candidate is selected for a first PU of the geometric prediction; and
    receive a signaled second binary flag that is coded using a second CABAC context modeling method to indicate whether a List 0 motion vector of the second candidate or a List 1 motion vector of the second candidate is selected for a second PU of the geometric prediction,
    wherein the first CABAC context modeling method and the second CABAC context modeling method comprise:
    signaling each binary flag as a CABAC context bin, and a CABAC probability under each context model is initialized differently in response to whether a current picture uses a backward prediction.

6. The apparatus for video coding with geometric prediction of claim 5, wherein at least two context models are available to decode the signaled second binary flag, with a context model selected based on a value of the signaled first binary flag.

7. The apparatus for video coding with geometric prediction of claim 5, wherein the one or more processors are further configured to: use a higher CABAC initial probability for each binary flag to indicate selecting a List 0 motion vector in case the current picture does not use the backward prediction than in case the current picture uses the backward prediction.

8. The apparatus for video coding with geometric prediction of claim 5, wherein the one or more processors are further configured to: decode the first binary flag as a CABAC bypass bin, and decode the second binary flag as a CABAC context coded bin.

9. A non-transitory computer-readable storage medium for video coding with geometric prediction storing computer-executable instructions that, when executed by one or more processors, cause the one or more processors to perform acts comprising:
    partitioning video pictures into a plurality of coding units (CUs), at least one of which is further partitioned into two prediction units (PUs) including at least one geometric shaped PU;
    constructing a first merge list comprising a plurality of candidates, based on a merge list construction process for regular merge prediction, wherein each one of the plurality of candidates is a motion vector comprising a List 0 motion vector, or a List 1 motion vector, or both;

receiving a signaled first index value to indicate a first candidate that is chosen from the first merge list;

receiving a signaled second index value to indicate a second candidate that is chosen from the first merge list;

receiving a signaled first binary flag that is coded using a first context-adaptive binary arithmetic coding (CABAC) context modeling method to indicate whether a List 0 motion vector of the first candidate or a List 1 motion vector of the first candidate is selected for a first PU of the geometric prediction; and receiving a signaled second binary flag that is coded using a second CABAC context modeling method to indicate whether a List 0 motion vector of the second candidate or a List 1 motion vector of the second candidate is selected for a second PU of the geometric prediction wherein the first CABAC context modeling method and the second CABAC context modeling method comprise:

signaling each binary flag as a CABAC context bin, and a CABAC probability under each context model is initialized differently in response to whether a current picture uses a backward prediction.

10. The non-transitory computer-readable storage medium for video coding with geometric prediction of claim 9, wherein at least two context models are available to decode the signaled second binary flag, with a context model selected based on a value of the signaled first binary flag.

11. The non-transitory computer-readable storage medium for video coding with geometric prediction of claim 9, wherein the computer-executable instructions cause the one or more processors to further perform: using a higher CABAC initial probability for each binary flag to indicate selecting a List 0 motion vector in case the current picture does not use the backward prediction than in case the current picture uses the backward prediction.

12. The non-transitory computer-readable storage medium for video coding with geometric prediction of claim 9, wherein the computer-executable instructions cause the one or more processors to further perform: decoding the first binary flag as a CABAC bypass bin, and decoding the second binary flag as a CABAC context coded bin.

* * * * *